(12) United States Patent
Hinegardner et al.

(10) Patent No.: US 6,803,929 B2
(45) Date of Patent: Oct. 12, 2004

(54) METHOD, APPARATUS AND COMPUTER PROGRAM PRODUCT FOR MOVING OR COPYING INFORMATION

(75) Inventors: Michael Douglas Hinegardner, Round Rock, TX (US); Jessica Kelley Murillo, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 09/899,456

(22) Filed: Jul. 5, 2001

(65) Prior Publication Data

US 2003/0007007 A1 Jan. 9, 2003

(51) Int. Cl.[7] .............................................. G09G 5/00
(52) U.S. Cl. ...................... 345/769; 345/748; 345/764; 345/770
(58) Field of Search ................................ 345/769, 748, 345/764, 770

(56) References Cited

U.S. PATENT DOCUMENTS

| | | | | | |
|---|---|---|---|---|---|
| 5,544,302 | A | * | 8/1996 | Nguyen | 345/161 |
| 6,331,840 | B1 | * | 12/2001 | Nielson et al. | 345/769 |
| 2003/0001895 | A1 | * | 1/2003 | Celik | 345/769 |

* cited by examiner

Primary Examiner—Kristine Kincaid
Assistant Examiner—Mylinh T Tran
(74) Attorney, Agent, or Firm—Diana L. Roberts; Anthony V. S. England; Volel Emile

(57) ABSTRACT

A method for a user interface includes selecting information from a current location and placing the information in a queue for later placement at a destination, and then selecting a destination and placing the information at the destination. Responsive to the placing of the information in the queue, and until the placing of the information at the destination, the information is displayed in the current location and an appearance of a user display pointer shows that the queue has an entry. The queue is capable of holding second information concurrent with the first information.

36 Claims, 7 Drawing Sheets

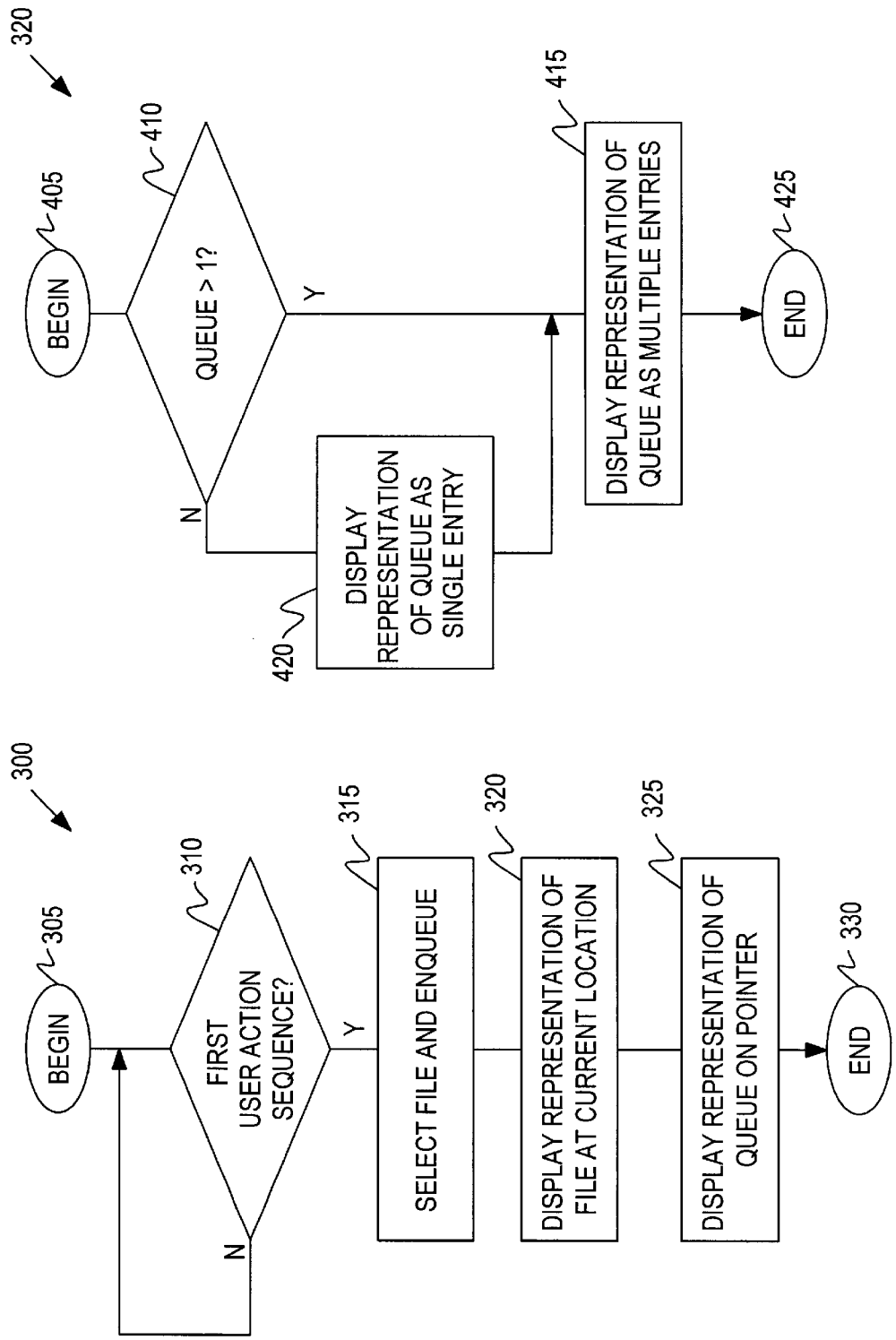

METHOD, APPARATUS AND COMPUTER PROGRAM PRODUCT FOR MOVING OR COPYING INFORMATION

BACKGROUND

1. Field of the Invention

This invention concerns a method, apparatus and computer program product relating to a user interface for a computer system, and more particularly to a user interface for copying or moving information on a computer system.

2. Related Art

It is conventional to move or copy a file on a computer system by "dragging and dropping," where the user places a mouse pointer over the file in a file manager window, presses down one of the mouse buttons and holds it down while moving the pointer to a destination location, e.g., folder, at which time the user releases the button. If the destination folder does not already exist and the user discovers this in the middle of the drag-and-drop procedure, then the user has to stop, create the folder, and repeat the drag-and-drop procedure.

With the conventional drag and drop method, the destination selection, etc. must be done immediately after selecting a file, with no other operations intervening. With another conventional method this immediacy requirement is avoided by selecting with a pointer and then using keyboard combinations such as <control><c> or <control><x> in a first user action sequence, to select the file or files to be copied or moved, and <control><p> in a second user action sequence to place the file or files at the destination (or, similarly, using the pointer and a copy or cut icon for the first sequence, and then a paste icon for the second sequence). However, these methods require numerous steps. Even using the pointer and icons requires one click (i.e., press and release) of a mouse button to select the file and another click to select the copy or cut icon for the first user action sequence. Also, these methods require deciding whether to copy or cut as part of the first user action sequence instead of the second, which somewhat limits user choice.

For the conventional drag-and-drop method there is another disadvantage. That is, if the mouse button is inadvertently released during the drag-and-drop operation is possible for a file to disappear from view into a folder which was inadvertently selected by the inadvertent release of the button. It's even possible that the user may not know which folder was inadvertently selected.

From the above it should be appreciated that because user action sequences for a conventional user interface lack a certain independence between selecting information, deciding whether to copy or move the information, and deciding where to place the information or its copy, or else the user steps of certain conventional user actions sequences are too numerous, a need exists for an improved user interface for copying and moving information. It should also be understood that the need also exists because certain conventional user action sequences tend to lend themselves to unintentional results.

SUMMARY OF THE INVENTION

The above described need is addressed in the present invention, according to which a method for moving or copying information, such as a file, includes selecting a first file from a current, i.e., source, location (e.g., folder) and placing the information in a memory associated with the pointer (referred to herein as a "pointer queue," or simply a "queue") for later placement at a destination location. The queue is capable of holding a second file concurrent with the first file. Responsive to the placing of the information in the queue, the information is displayed in the current location and an appearance of a user display pointer shows that the queue has an entry. An entry for the information stays in the pointer queue until the information is placed at a destination. The appearance of the pointer remains as a reminder to the user to place the information at a destination. The pointer returns to its conventional appearance when the pointer queue is empty, i.e., when the information is placed at the destination. This is advantageous because it provides the user more information in a manner that is easy to see and understand.

In one aspect, this selecting of the file and placing it in the queue is responsive to a first user action sequence, which may, in one alternative, require only pointing of a pointer and a single-click on a button of the pointer device (e.g., mouse), the pointing and clicking being referred to herein as a "single-entry user action sequence". Also in an aspect, the placing of information at a destination location is responsive to a second user action sequence, and if the queue has a single entry, the second user action sequence may also be a single-entry user action sequence. This is advantageous because the single-entry action sequence is quicker and easier.

In another aspect, the first and second user action sequences are independent of one another such that the first information can be placed at the destination by the second user action sequence without the first user action sequence being repeated for the information. This is advanteous because the invention enables another, possibly unrelated, user action to intervene between the first and second user action sequences.

In another aspect, second information may be selected from a current location and placed in the pointer queue while the first information is still in the queue. The second information is selected responsive to a second instance of the first user action sequence. Responsive to the placing of the second information in the queue, an appearance of the user display pointer shows that the queue has multiple entries until the first or second information is placed at its destination.

In a still further aspect, if the pointer queue has multiple entries then the second user action sequence includes selecting one of the entries from a list of the entries in the queue.

In various alternatives, the single-entry user action sequence is selecting responsive to a pointer of a pointing device being pointed on a user display and placing responsive to a sound being communicated or a button of the pointing device or key of a data entry device being pressed and released.

In another aspect, the second user action sequence includes selecting to i) copy the information, in which case a copy of the information is left at its current, i.e., original, location, or ii) move the information, in which case the information is deleted from the current location. That is, the user is enabled by the invention to defer the choice of whether to move or copy the information until the information is placed at a destination.

Other objects and advantages of the invention will become apparent upon reading the following detailed description and upon reference to the accompanying drawings.

BRIEF DESCRIPTION OF THE DRAWINGS

FIG. 3 illustrates an algorithm for selecting a file and placing the file in a queue associated with a pointer, according to an embodiment of the invention.

FIG. 4 illustrates an algorithm for determining how a queue entry signifier (FIG's 1 and 2) should appear responsive to a file being selected and enqueued, according to an embodiment of the invention.

DETAILED DESCRIPTION OF THE INVENTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
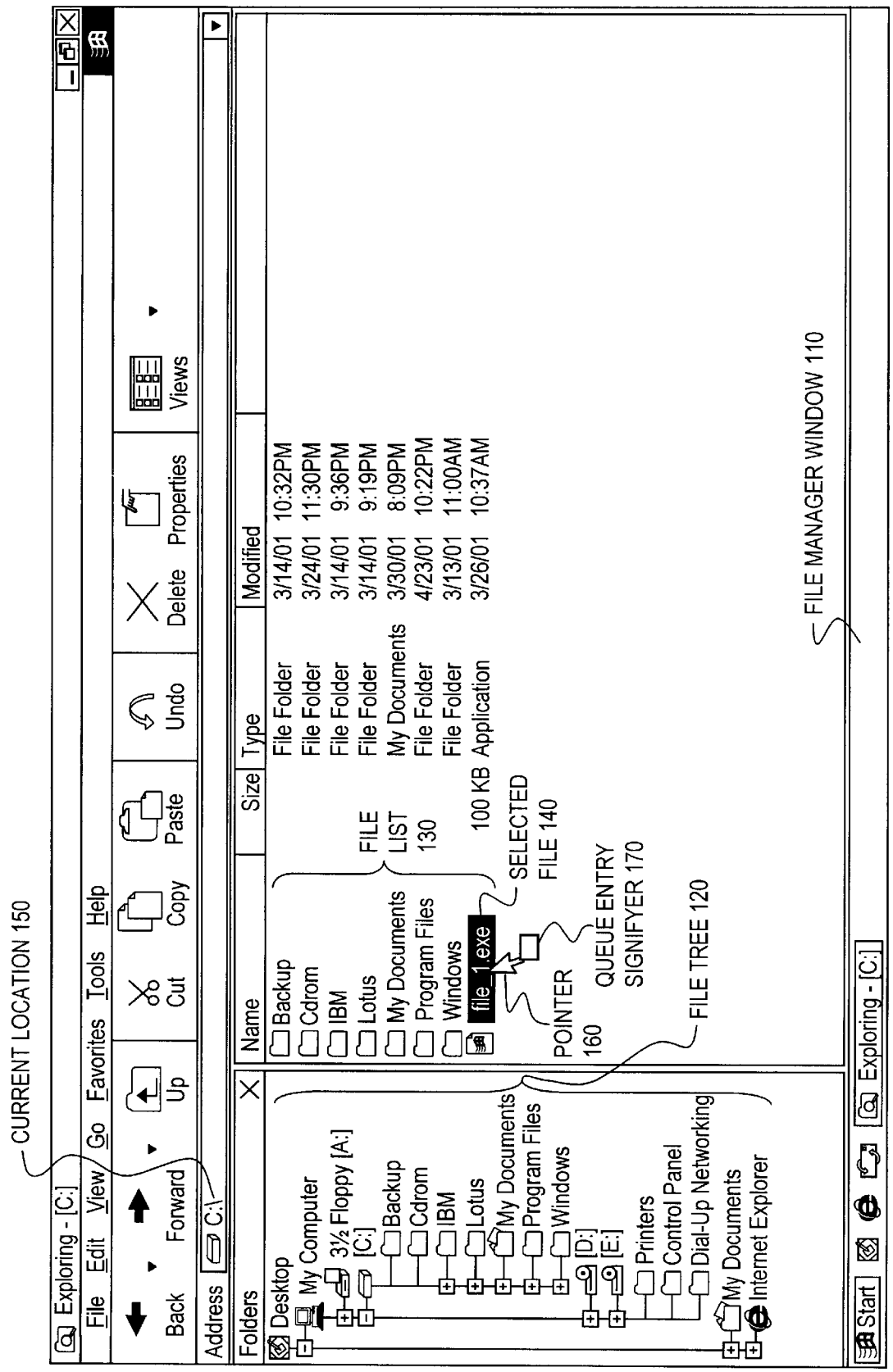
FIG. 1 illustrates certain aspects, including front of screen aspects, regarding selecting a file and enqueuing the file, according to an embodiment of the invention.

Referring now to FIG. 1, certain aspects, including front of screen aspects of the invention, are illustrated regarding selecting a file and enqueuing the file, that is, placing the file in a queue, according to an embodiment. A computer system (shown in one of the other FIG's herein, and described in more detail in connection with the description of that FIG.) runs an operating system that provides a file manager window 110, as shown, on a display device of the computer system. The computer system includes a data entry device, such as a keyboard, and a pointing device, such as a mouse. The term "user input device" is used herein to refer to either the data entry or the pointing device.

The file manager window 110, as shown, provides a user interface for the user to select the file with a pointer 160. In particular, the file manager window 110 provides a representation of directories for a storage device in the form of a file tree 120, as shown. The user may select a directory from the file tree 120 where a particular file of interest is located. In the embodiment shown in FIG. 1 the root directory "C:\" is the focus of the window 110. Accordingly, the file manager window 110 shows a representation of the files for the root directory in the form of a file list 130, as shown. In this particular case, the root directory is the current location 150 of the file of interest, "file __ 1.exe," that is, selected file 140.

In order to copy or move the selected file 140, according to an embodiment, the user selects the file 140 and places it in a queue associated with the pointer 160 by pointing at the file 140 with the pointer 160 and pressing the left button of the pointing device and holding it down for a least 3 seconds, or some other certain minimum time interval which the user may set, with the pointer remaining in a substantially fixed position over the representation of the file 140 in the file list 130 before releasing the button. This pointing, pressing, holding and releasing is one embodiment of what is referred to herein as a first user action sequence.

Aspects of the first user action sequence can be seen in this front of screen view in FIG. 1. Responsive to the file 140 being placed in the queue, the pointer 160 changes its appearance, as shown in the file manager window 110. In the illustrated embodiment, the pointer 160 changes appearance by attachment of a queue entry signifier 170 to the pointer 160, as if the pointer 160 has put on a backpack.

In the illustrated embodiment, the first user action sequence is a single entry action, according to which the user moves the pointer 160 over the representation of the selected file 140 in the file list 130, and then presses and releases a button on the pointing device (not shown) for the pointer 160. This is referred to as a "single entry action" because although it does require both movement of the pointing device and clicking of the pointing device button, it requires only a single click, that is all, only a single pressing and releasing of the button.

It is conventional to select a file by a single click of a left button on a pointing device, and to both select the file and bring up a menu by a single click of a right button on the pointing device. In order to distinguish between these conventional actions, according to one of the embodiments of the present invention, as has been described hereinabove, a file is selected and enqueued for later placement at a destination by pointing and then pressing the left button of the pointing device and holding it down for a least a certain minimum time interval with the pointer remaining in a substantially fixed position over the representation of the file 140 in the file list 130 before releasing.

It is also conventional to move or copy a file by dragging and dropping, where the user places the pointer over the file presses down one of the pointing device buttons and holds it down while moving the pointer to a destination location, at which time the user releases the button. Conventionally, if it is the left button that is pressed, in certain contexts the file is moved as soon as the pointer is placed over the destination location and the button is released, in which case the file no longer appears in its original location. As has been previously stated, it is a disadvantage of this conventional method that if the wrong destination location is inadvertently selected, or the button is inadvertently released over the wrong destination, the file will be moved from the original location to an incorrect destination. This can be particularly annoying when the button was inadvertently released and the user does not even know which location was inadvertently selected for the file's destination. Also, the conventional left click drag-and-drop operation in some contexts is a copy operation instead of a move operation. It can be especially annoying if the user intended a left click drag-and-drop operation to be a copy operation, but the user inadvertently drops the file at the wrong location by accidentally releasing the left pointer button, and this results in moving the file to an unknown location instead of copying it.

Conventionally if it is the right pointer device button that is pressed instead of the left, then when the pointer is brought to rest over a destination location and the button is released a menu pops up from which the user may select to copy or move the file. Until the user makes that selection, which may be done by left clicking on one of the menu choices for example, the pointer cannot be used for other operations. Thus, with the conventional drag and drop operation, selection of whether the file is to be moved or copied is dependent on the selection of a destination and the placement of the file at the destination insofar as the destination selection etc. must be done immediately after selecting a file, with no other operations intervening. In some respects a certain independence between first and second user action sequences is achieved by a conventional copy or cut and paste operation it, using <control-c> or <control-x> and <control-p>, or using the pointer and a copy or cut icon and then a paste icon. However, even using the pointer this requires one click to select the file and another to select the copy or cut icon for the first user action sequence. Also, it requires deciding whether to copy or cut as part of the first user action sequence instead of the second, which somewhat limits user choice.

As shown in FIG. 1, according to the present embodiment even after the file 140 has been selected and placed in the queue, a representation of the file 140 remains in the file list 130. That is, the representation of the file 140 in the file list 130 does not change, even though the file 140 may still be moved from its current location 150 when the user completes the move or copy operation with a second user action sequence in which a destination location is selected and the file 140 is placed at the destination. In particular contrast to the conventional drag-and-drop operation, the second user action sequence is independent of the first. That is, although the first user action sequence does require both pressing and releasing the pointer device button to complete the file selecting and enqueuing, it is nevertheless independent of selecting: i) the destination location, ii) whether the file is to be moved, and iii) whether the file is to be copied. Contrast this to present conventions, wherein the dragging and dropping are all part of the same one-click sequence, or wherein the choice of whether to move or copy is part of a first user action sequence, e.g., selecting the file and initiating the process with a cut or copy icon, or with key combinations <control><x> or <control><c>, rather than a second sequence, e.g., selecting the destination and pasting.

Figure 2:
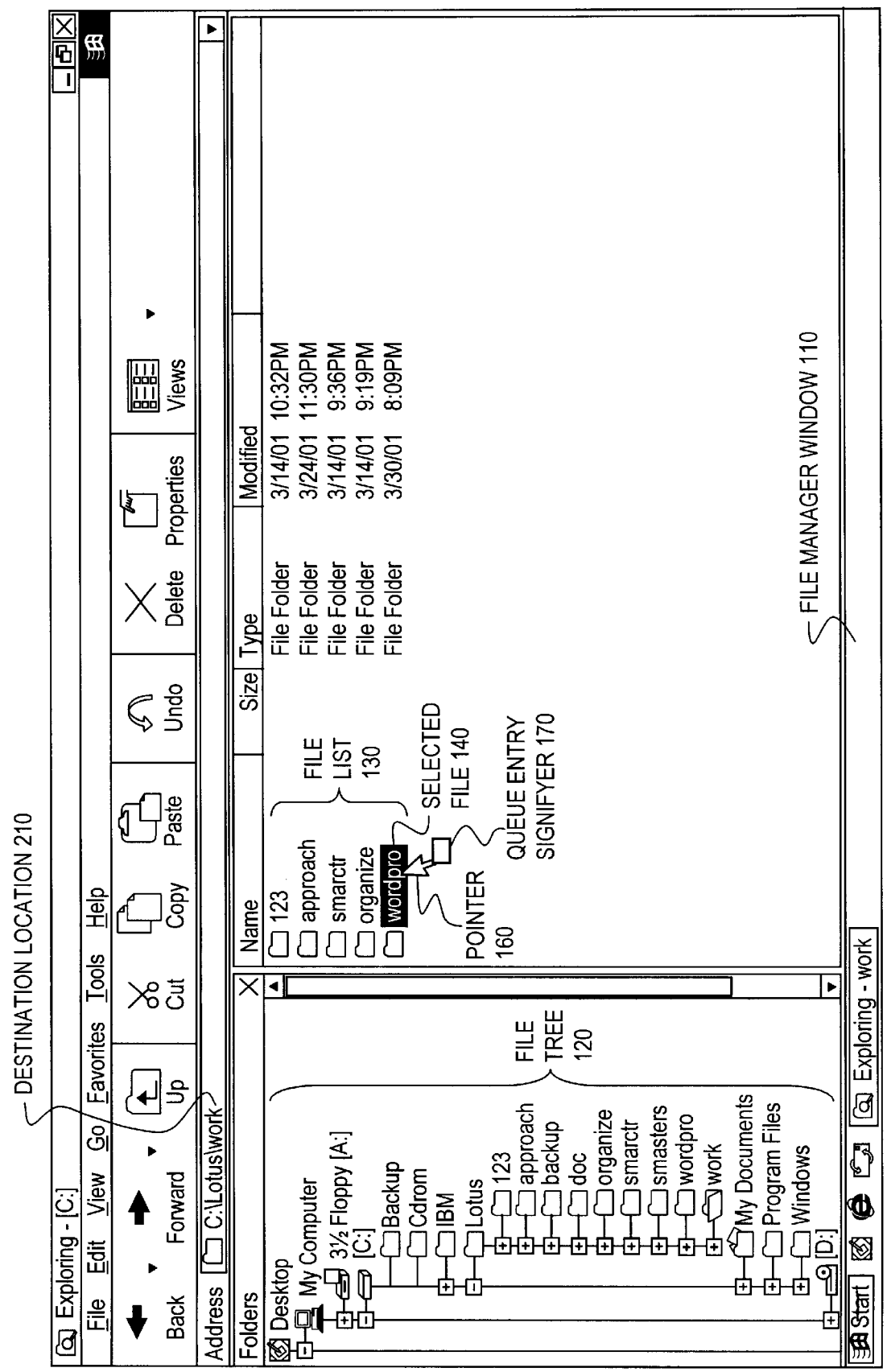
FIG. 2 illustrates certain aspects, including front of screen aspects, regarding selecting a destination for the file and placing the file at that destination, according to an embodiment of the invention.

Referring now to FIG. 2, certain aspects, including front of screen aspects of the invention, are illustrated regarding selecting a destination for the file and placing the file at that destination, according to an embodiment. In order to complete the steps to copy or move the earlier selected file 140 (FIG. 1), according to an embodiment the user selects the destination location 210 by pointing and places the file 140 by pressing and holding down the left button on the pointing device for more than a certain minimum time interval before releasing the button if the user wants to move the file 140 from its original location. If the user instead wants to copy the file 140, then after placing the pointer 160 over the selected destination 210 the user presses and holds down the right button on the pointing device for more than a certain minimum time interval before releasing the button.

This pointing, pressing, holding and releasing is referred to herein as a second user action sequence, aspects of which can be seen in front of screen view in FIG. 2. As shown in the view of the file manager window 110 in FIG. 2, a destination location 210 "C:\Lotus\work\wordpro" has been selected as the directory to which the file 140 (FIG. 1) will be moved or copied. Since the file 140 is already in the queue, the pointer 160 includes the queue entry signifier 170 appearance, as shown. In the illustrated embodiment, if there is only one file in the queue associated with the pointer 160 the second user action sequence may also be a single entry action, according to which the user moves the pointer 160 over the representation of the destination location 210 in the file list 130 or directory tree 120, and then presses and releases a button on the pointing device (not shown) for the pointer 160. Of course, if the file 140 is moved, then it is deleted from its original location, but if the file 140 is copied, then a copy of it is left in its original location.

Figure 7:
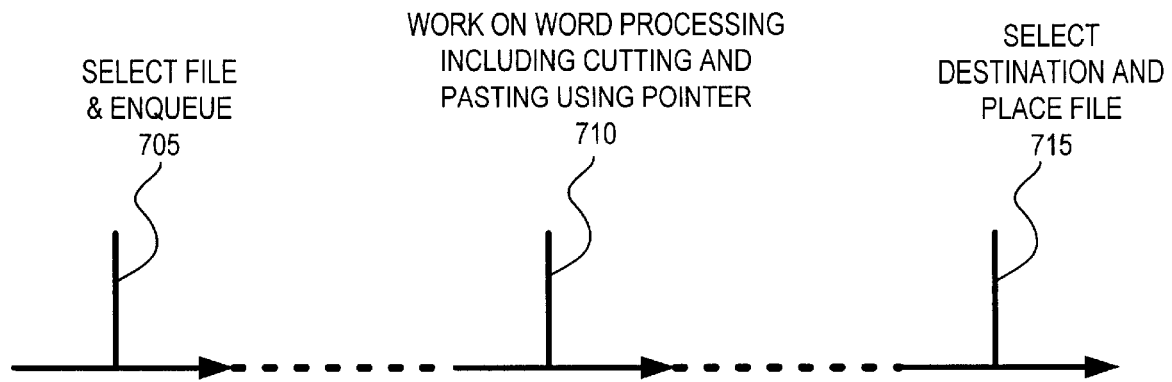
FIG. 7 illustrates a sequence in which other operations intervene between a first user action sequence, in which the file is selected and enqueue, and a second sequence, in which the destination location is selected and the file is placed at that location, according to an embodiment of the invention.

FIG. 7 illustrates that other operations may intervene between the first user action sequence 705, in which the file is selected and enqueue, and the second sequence 715, in which the destination location is selected and the file is placed at that location. The other operations may include selecting other files to move or copy, or they may be entirely unrelated to file moving and copy. For example, in an intervening action the focus may be changed to a word processing application, and in that application an operation 710 may be performed in which the pointer may be used to cut and paste words within the document but not to select, move, or copy files. Nevertheless, when the user returns to the file manager window 110 focus, the pointer 160 resumes the appearance in which it has the queue entry signifier 170 attached. And from this window 110 the file may be moved or copied merely by performing the second user action sequence 715, without repeating the file selecting and enqueuing of the first user action sequence 705, even though other operations such as operation 710 have intervened since the time when the first user action sequence 705 was performed.

Referring now to FIG. 3, an algorithm 300 is shown for selecting a file and placing the file in a queue associated with a pointer. The algorithm begins at 305, and waits at 310 for a first user action sequence. Responsive to the user performing the action sequence, the user specified file is selected and placed in the queue at 315. At 320 a representation of the file is displayed at its original, that is, current location. At 325 a representation of the queue is displayed as if attached to the pointer. The algorithm ends at 330. At this point other user operations may be performed before the moving or copying of the enqueued file is completed responsive to a second user action sequence.

It should be a understood from the foregoing that after a first file has been selected and enqueued for moving or copying a second file may be selected and enqueued before the first file has been moved or copied it to its ultimate destination. Thus, the queue may have more than one file in it at one time. This further distinguishes the present invention from a copying or moving operation by the conventional copy or cut and paste method, since with the conventional copying or cutting only a single file may be copied to the clipboard.

Figure 9:
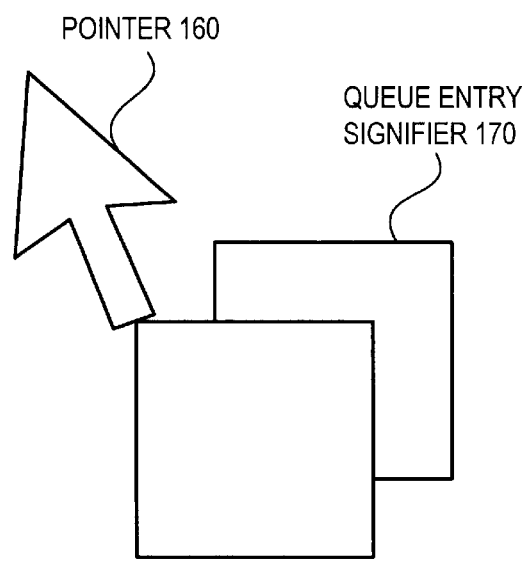
FIG. 9 illustrates the appearance of a pointer when a queue associated with the pointer has multiple entries, according to an embodiment of the invention.

Referring now to FIG. 4, an algorithm 320 is shown for determining how the queue entry signifier 170 (FIG's 1 and 2) should appear responsive to a file being selected and enqueued, that is, for step 320 shown in FIG. 3. The algorithm 320 begins at 405, and then at 410 a determination is made as to whether the queue now has more than one entry. If not, then the queue entry signifier 170 appears as a symbol entry at 420. this is how the signifier 170 is shown in FIG's 1 and 2. Then the algorithm ends at 425. If the queue has more than one entry, however, then at 415 the queue entry signifier 170 is rendered with the appearance of multiple entries, and then the algorithm ends at 425. Consider that the queue entry signifier 170 and FIG's 1 and 2 looks something like a small card. In these terms, in one embodiment, the appearance of multiple entries is achieved by changing the appearance of the signifier 170 to that of a stack of cards, as shown in FIG. 9.

Figures 5, 6:
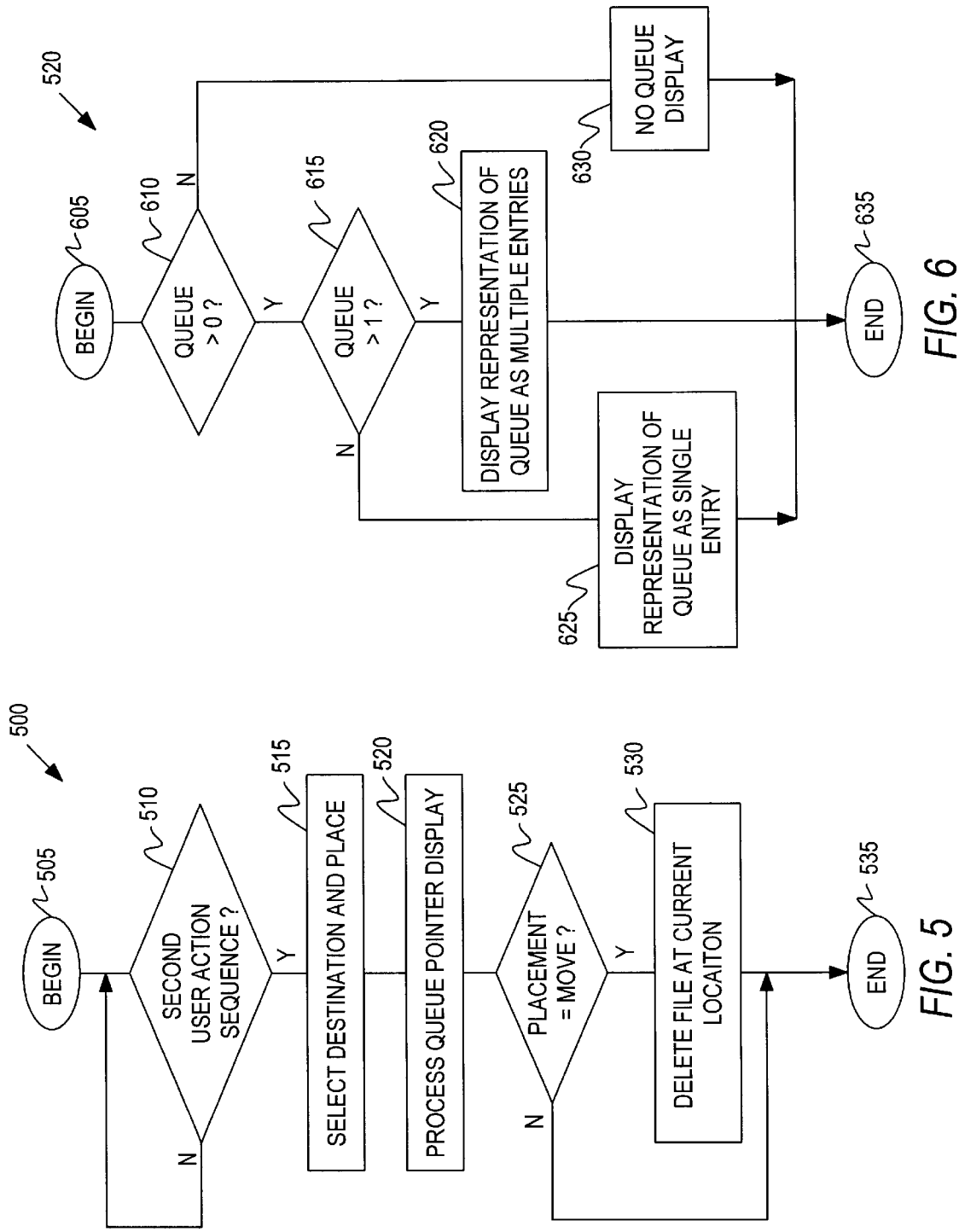
FIG. 5 illustrates an algorithm for selecting a destination location and placing a file at the location, enqueued, according to an embodiment of the invention.
FIG. 6 illustrates an algorithm for determining appearance of and rendering the pointer responsive to a destination location being selected and a file being placed there, according to an embodiment of the invention.

Referring now to FIG. 5, an algorithm 500 shown for selecting the destination location and placing the file at the location, that is, moving or copying the file to the location. The algorithm 500 begins at 505, and waits at 510 for a second user action sequence. Responsive to the user performing the action sequence, at 515 the user specified destination is selected and the file is placed at the location. Then, at 520, a new appearance of the pointer is determined and rendered. At 525 The algorithm determines whether the user action sequence specified that the file should be copied or instead moved. If moved, then at 530 file is deleted from its original location, and the algorithm ends at 535. If copied, then the file is not deleted from its original location, so the algorithm instead goes directly to the end at 535.

Referring now to FIG. 6, an algorithm is shown for the step 520 from FIG. 5 in which the appearance of the pointer is determined and rendered responsive to a destination location being selected and a file being placed there. The algorithm 520 begins at 605, and then at 610 a determination is made as to whether responsive to the file being placed the queue is now empty, that is whether the queue has more than zero entries. If the queue is now empty, then at 630 the queue entry signifier 170 (FIG's 1 and 2) is removed from the pointer 160, and then the algorithm ends at 635. If the queue is not now empty, and then at 615 determination is made as to whether the queue has more than one entry. If not, then at 625 the queue entry signifier 170 is rendered with the appearance of a single entry, and then the algorithm ends at 635. If the queue does have more than one entry, then at 630 the queue entry signifier is rendered with the appearance of multiple entries, and then the algorithm ends at 635.

Figure 8:
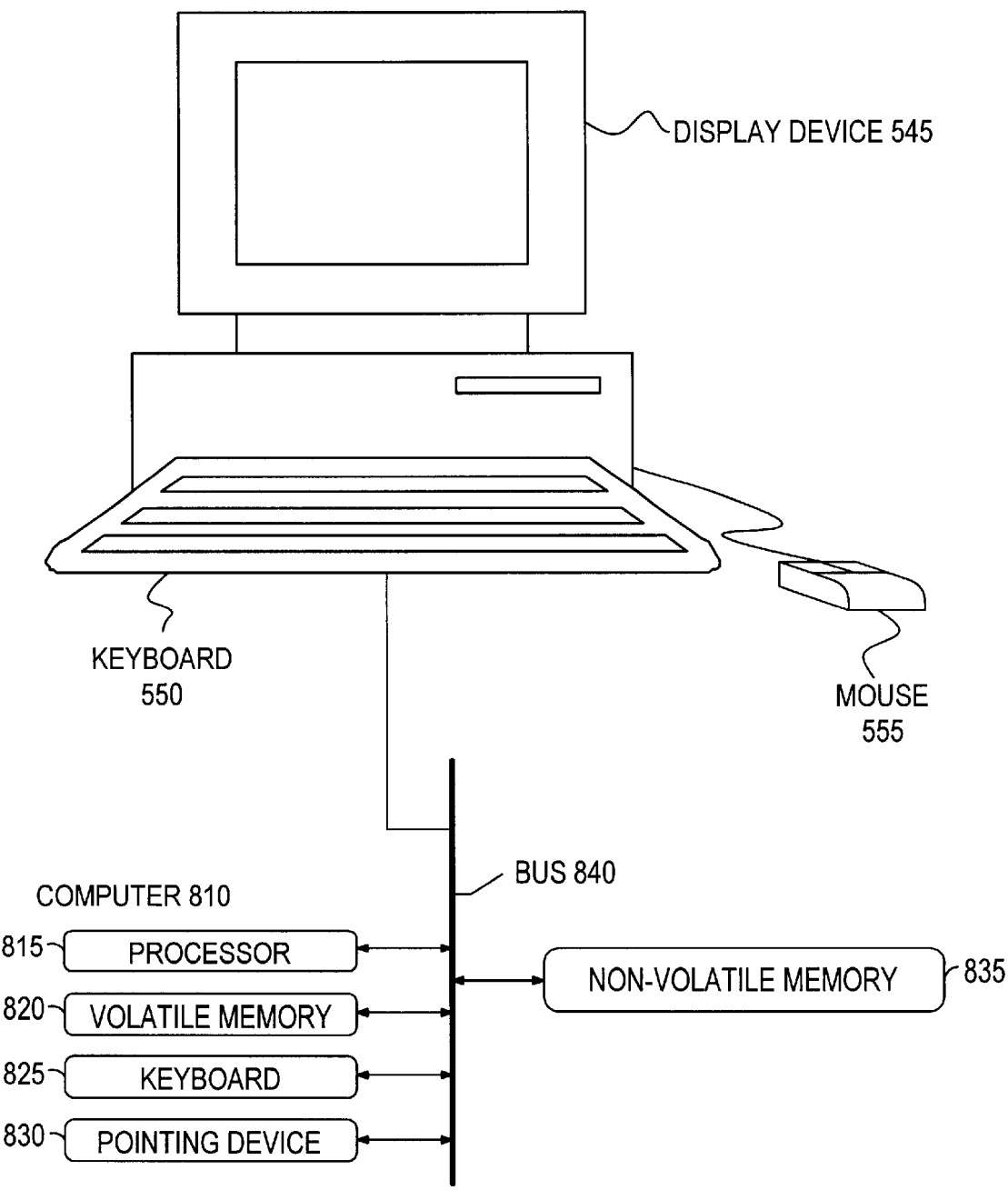
FIG. 8 illustrates a computer system that is generally applicable for an embodiment of the invention.

Referring now to FIG. 8, a computer system 810 is shown that is generally applicable for the embodiment described. The computer 810 has a processor 815, a volatile memory 820 (that is, RAM), a keyboard 825, a pointing device 830, a nonvolatile memory 835 (for example, ROM, hard disk, floppy disk, CD-ROM, etc.), and a display device 805. The memory 820 and 835 are for storing a program for controlling the processor 815, and the processor is operative with the program to perform as described herein. The display device 805 shown could use a cathode ray tube ("CRT"), liquid crystal, field emission device, or some other type of display element. These components in the device 810 are interconnected by bus 840. The keyboard is a device of the sort that has been referred to herein as a "data entry" device. In other embodiments a data entry device is a microphone for receiving voice commands, or a keypad.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such as floppy disk, a hard disk drive, a ROM, and CD-ROM, and transmission-type media such as digital and analog communications links, e.g., the Internet.

The description of the present embodiment has been presented for purposes of illustration, but is not intended to be exhaustive or to limit the invention to the form disclosed.

Many additional aspects, modifications and variations are also contemplated. For example, as was stated above, after a first file has been selected and enqueued for moving or copying, a second file, third file, etc. maybe selected and enqueued before the first file has been moved or copied to its ultimate destination. In this circumstance the queue associated with the pointer 160 will have more than one entry. This gives rise to additional aspects of the invention.

Figure 10:
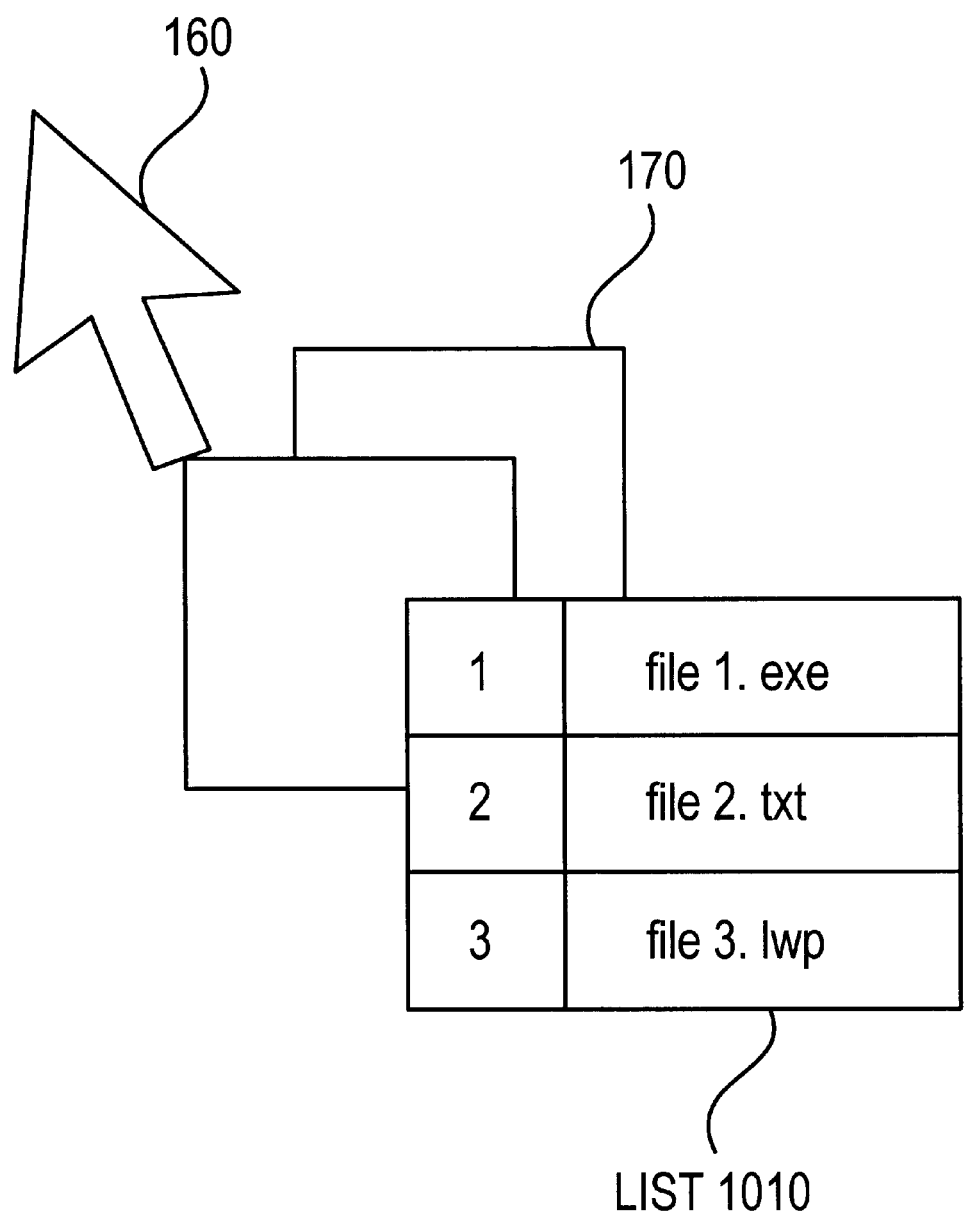
FIG. 10 illustrates a pop-up list of entries in the pointer queue, according to an embodiment of the invention.

Referring now to FIG. 10, in one aspect, responsive to the previously described second user action sequence, if the queue associated with pointer 160 has more than one entry, a list 1010 of the files in the queue pops up to allow user selection of which file is to be moved or copied. In one embodiment, the user selects the file by placing the pointer 160 on the entry for the file in the list, and clicking a certain one of the pointing device buttons. In another embodiment, the entries in the list 1010 are numbered as shown in FIG. 10, and the user selects a file from the list by entering a number using the keyboard.

In another aspect, the list 1010 of files in the queue is displayed responsive to a certain user action sequence, which the user may perform prior to the user action sequence for selecting a destination and placing a file at the destination. That is, in one embodiment, responsive to the user entering the key combination <control><b> the list of files in the queue pops up. The user may then select one of the files, and then perform a user action sequence to select a destination and place the file at the destination.

In another aspect, if there are a number of files in the queue, then the list 1010 of files includes an item which permits the user to select all files in the queue, in case the user wants to move or copy all of the files to a certain destination.

Emphasis has been placed, in the descriptions of user action sequences above, on the pointer device button for selecting and enqueuing a file, selecting a file from the queue, or selecting a destination and placing a file at the destination. It should be understood, however, that other user actions are also contemplated as alternatives. For example, alternatives include holding down a certain key of the keyboard for more than a certain time, pointing while pressing a certain key of the keyboard, pointing while holding down a certain key of the keyboard for more than a certain time, pointing while pressing a certain combination of keys, pointing while holding down a certain combination of keys for more than a certain time, speaking certain words, or pointing while speaking certain words.

In the above, reference has been made to placing the pointer over a location, such as a directory, placing the pointer over a file, enqueuing the file, leaving the file at a current location, etc. It should be understood that this manner of speaking is meant to include placing the pointer over a representation of the file or location, etc. That is, for example, in FIG. 1 the file manager window 110 displays a representation of the file shown as selected file 140. It should also be understood that enqueuing the file may refer to putting a representation of the file in the queue, that is, putting an entry in the queue that points to the file.

It should be appreciated from the above that the invention provides a number of advantages over the prior art, including enabling a user to move or copy information in less steps, providing the user a display associated with the pointer to remind the user that information has been placed in a queue for moving or copying, permitting more than one piece of information, for example, files, to be placed in the queue before any of the pieces are moved or copied, and enabling the user to defer selecting whether to move or copy the information. The embodiments were chosen and described in order to best explain the principles of the invention and its practical applications, and to enable others of ordinary skill in the art to understand the invention. Various other embodiments having various modifications may be suited to a particular use contemplated, but may be within the scope of the present invention.

What is claimed is:

1. A method for moving or copying information, comprising the steps of:

selecting first information from a current location;

placing the information in a queue for later placement at a destination, the queue being capable of holding second information concurrent with the first information, wherein responsive to the placing of the first information in the queue an appearance of a user display pointer shows that the queue has an entry;

selecting a destination for the first information; and placing the first information at the destination, wherein responsive to the placing of the first information at the destination the appearance of the user display pointer shows that the queue is empty.

2. The method of claim 1, comprising the steps of:

selecting second information from a current location; and placing the second information in the queue for placement at a destination, wherein the selecting and placing of the second information in the queue are before placing the first information at a destination, and wherein responsive to the placing of the second information in the queue, and until the placing of the first or second information at its destination an appearance of the user display pointer shows that the queue has multiple entries.

3. The method of claim 2, wherein the method comprises selecting from among multiple in the queue if the queue has multiple entries.

4. The method of claim 1, wherein the information selecting and placing in the queue are responsive to a first user action sequence, the first user action sequence being a single-entry user action sequence, and wherein the destination selecting and placing at the destination are responsive to a second user action sequence, the second user action sequence being a single-entry user action sequence.

5. The method of claim 4, wherein the single-entry user action sequence is selecting responsive to a pointer of a pointing device being pointed on a user display and placing responsive to a sound being communicated or a button of the pointing device or key of a data entry device being pressed and released.

6. The method of claim 1 comprising the step of selecting whether to copy the information, wherein a copy of the information is left at the current location, or to move the information, wherein the information is deleted from the current location, wherein the steps of selecting the destination, selecting whether to copy or move the information and placing the information are all responsive to a certain user action sequence, and the steps of selecting the information and placing the information in the queue are not responsive to the certain user action sequence.

7. The method of claim 1, comprising the step of selecting whether to copy the information, wherein a cony of the information is left at the current location, or to move the information, wherein the information is deleted from the current location, wherein the information selecting and placing in the queue are responsive to a first user action sequence and the destination selecting, selecting whether to copy or move and placing at the destination are responsive to a second user action sequence, wherein the first and second user action sequences are independent of one another such that the first information can be placed at the destination by the second user action sequence without the first user action sequence being repeated for the information even if another instance of a user action intervenes between the first and second user action sequences.

8. A method for copying or moving information, comprising the steps of:

selecting information from a current location;

placing the information in a queue for later placement at a destination, wherein the information selecting and placing in the queue are responsive to a first user action sequence; and selecting a destination for the information; and placing the information at the destination, wherein the destination selecting and placing at the destination are responsive to a second user action sequence, and wherein the first user action sequence is a single-entry user action sequence and is independent of the second user action sequence, such that the second user action sequence comprises selecting whether to copy the information, wherein a copy of the information is left at the current location, or to move the information, wherein the information is deleted from the current location.

9. The method of claim 8, wherein the first user action sequence is a single-entry user action sequence, and if the queue has a single entry when the information is placed at its destination the second user action sequence is a single-entry user action sequence.

10. The method of claim 9, wherein the single-entry user action sequence is selecting responsive to a pointer of a pointing device being pointed on a user display and placing responsive to a sound being communicated or a button of the pointing device or key of a data entry device being pressed and released.

11. The method of claim 8, wherein responsive to the placing of the information in the queue, and at least until the placing of the information at its destination, a representation of the information is displayed in the current location and an appearance of a user display pointer shows that the queue has an entry.

12. The method of claim 8, wherein the independence of the first and second user action sequences permits the first information to be placed at the destination by the second user action sequence without the first user action sequence being repeated for the information even if another instance of a user action intervenes between the first and second user action sequences.

13. A system for moving or copying information comprising:

a user display;

one or more user input devices;

a processor; and a memory for storing a program, wherein the processor is operable with the program for selecting first information from a current location and placing the information in a queue for later placement at a destination, the queue being capable of holding second information concurrent with the first information, wherein the information selecting and placing in the queue are responsive to a first user action sequence received by at least one such user input device, and wherein the processor is further operable with the program for selecting a destination and placing the information at the destination, wherein the destination selecting and placing at the destination are responsive to a second user action sequence received by at least one such user input device, wherein responsive to the placing of the information in the queue, and until the placing of the information at the destination, a representation of the information is displayed in a representation of the current location and an appearance on the display of a user display pointer shows that the queue has an entry.

14. The system of claim 13 wherein the processor is further operable with the program for selecting second information from a current location and placing the second information in the queue for placement at a destination, wherein the selecting and placing of the second information in the queue are before placing the first information at a destination and are responsive to a second instance of the first user action sequence, and wherein responsive to the placing of the second information in the queue, and until the placing of the first or second information at its destination an appearance of the user display pointer shows that the queue has multiple entries.

15. The system of claim 14, wherein the method comprises selecting from among multiple entries in the queue if the queue has multiple entries.

16. The system of claim 15, wherein the first user action sequence is a single-entry user action sequence, and if the queue has a single entry the second user action sequence is a single-entry user action sequence.

17. The system of claim 13, wherein the single-entry user action sequence is selecting responsive to a pointer of a pointing device being pointed on the user display and placing responsive to a sound being communicated or a button of the pointing device or key of a data entry device being pressed and released.

18. The system of claim 13, wherein the processor is operable within the program for selecting whether to copy the information, wherein a copy of the information is left at the current location, or to move the information, wherein the information is deleted from the current location—within the selecting whether to copy or move the information is also responsive to the second user action sequence and the selecting of the information and placing of the information in the queue are pot responsive to the second user action sequence.

19. The system of claim 13, wherein the first and second user action sequences are independent of one another such that the first information can be placed at the destination by the second user action sequence without the first user action sequence being repeated for the information even if another instance of a user action intervenes between the first and second user action sequences.

20. A system for copying or moving information comprising:
a user display;
one or more user input devices;
a processor; and
a memory for storing a program, wherein the processor is operable with the program for selecting information from a current location and placing the information in a queue for later placement at a destination, wherein the information selecting and placing in the queue are responsive to a first user action sequence received by at least one of such user input devices, and wherein the processor is further operable with the program for selecting a destination and placing the information at the destination, wherein the destination selecting and placing at the destination are responsive to a second user action sequence received by at least one of such user input devices, and wherein the first user action sequence is a single-entry user action sequence and is independent of the second user action sequence, such that the second user action sequence comprises selecting whether to copy the information, wherein a copy of the information is left at the current location, or to move the information, wherein the information is deleted from the current location.

21. The system of claim 20, wherein the first user action sequence is a single-entry user action sequence, and if the queue has a single entry when the information is placed at its destination the second user action sequence is a single-entry user action sequence.

22. The system of claim 21, wherein the single-entry user action sequence is selecting responsive to a pointer of a pointing device being pointed on a user display and placing responsive to a sound being communicated or a button of the pointing device or key of a data entry device being pressed and released.

23. The system of claim 20, wherein responsive to the placing of the information in the queue, and at least until the placing of the information at its destination, a representation of the information is displayed in the cutrent location and an appearance of a user display pointer shows that the queue has an entry.

24. The system of claim 20, wherein the independence of the first and second user action sequences permits the first information to be placed at the destination by the second user action sequence without the first user action sequence being repeated fir the information even if another instance of a user action intervenes between the first and second user action sequences.

25. A computer program product for moving or copying information comprising:
instructions for selecting first information from a current location;
instructions for placing the information in a queue for later placement at a destination, the queue being capable of holding second information concurrent with the first information, wherein responsive to the placing of the first information in the queue an appearance of a user display pointer shows that the queue has an entry;
instructions for selecting a destination for the first information; and
instructions for placing the first information at the destination, wherein responsive to the placing of the first information at the destination the appearance of the user display pointer shows that the queue is empty.

26. The computer program product of claim 25, comprising:
instructions for selecting second information from a current location and placing the second information in the queue for placement at a destination, wherein the selecting and placing of the second information in the queue are before placing the first information at a destination, and wherein responsive to the placing of the second information in the queue, and until the placing of the first or second information at its destination an appearance of the user display pointer shows that the queue has multiple entries.

27. The computer program product of claim 26, wherein the method comprises selecting from among multiple entries in the queue if the queue has multiple entries.

28. The computer program product of claim 27, wherein the information selecting and placing in the queue are responsive to a first user action sequence, the first user action sequence being a single-entry user action sequence, and wherein the destination selecting and placing at the destination are responsive to a second user action sequence, the second user action sequence being a single-entry user action sequence if the queue has a single entry.

29. The computer program product of claim 25, wherein the single-entry user action sequence is selecting responsive to a pointer of a pointing device being pointed on a user display and placing responsive to a sound being communicated or a button of the pointing device or key of a data entry device being pressed and released.

30. The computer program product of claim 25, comprising instructions for selecting whether to copy the information, wherein a copy of the information is left at the current location, or to move the information, wherein the information is deleted from the current location, within the selecting whether to copy or move the information is also responsive to the second user action sequence and the selecting of the information and placing of the information in the queue are not responsive to the second user action sequence.

31. The computer program product of claim 25, wherein the first and second user action sequences are independent of one another such that the first information can be placed at the destination by the second user action sequence without the first user action sequence being repeated for the information even if another instance of a user action intervenes between the first and second user action sequences.

32. A computer program product for copying or moving information comprising:

instructions for selecting information from a current location and placing the information in a queue for later placement at a destination, wherein the information selecting and placing in the queue are responsive to a first user action sequence; and instructions for selecting a destination and placing the information at the destination, wherein the destination selecting and placing at the destination are responsive to a second user action sequence, and wherein the first user action sequence is a single-entry user action sequence and is independent of the second user action sequence, such that the second user action sequence comprises selecting whether to copy the information, wherein a copy of the information is left at the current location, or to move the information, wherein the information is deleted from the current location.

33. The computer program product of claim 32, wherein the first user action sequence is a single-entry user action sequence, and if the queue has a single entry when the information is placed at its destination the second user action sequence is a single-entry user action sequence.

34. The computer program product of claim 33, wherein the single-entry user action sequence is selecting responsive to a pointer of a pointing device being pointed on a user display and placing responsive to a sound being communicated or a button of the pointing device or key of a data entry device being pressed and released.

35. The computer program product of claim 32, wherein responsive to the placing of the information in the queue and at least until the placing of the information at its destination, a representation of the information is displayed in the current location and an appearance of a user display pointer shows that the queue has an entry.

36. The computer program product of claim 32, wherein the independence of the first and second user action sequences permits the first information to be placed at the destination by the second user action sequence without the first user action sequence being repeated for the information even if another instance of a user action intervenes between the first and second user action sequences.

* * * * *

UNITED STATES PATENT AND TRADEMARK OFFICE
CERTIFICATE OF CORRECTION

PATENT NO. : 6,803,929 B2
DATED : October 12, 2004
INVENTOR(S) : Hinegardner et al.

It is certified that error appears in the above-identified patent and that said Letters Patent is hereby corrected as shown below:

Column 9,
Line 37, after "multiple" please insert -- entries --;

Column 11,
Line 45, please delete "pot" and insert -- not --;

Column 12,
Line 33, please delete "fir" and insert -- for --.

Signed and Sealed this

Fifteenth Day of March, 2005

JON W. DUDAS
*Director of the United States Patent and Trademark Office*